(12) United States Patent
Yang et al.

(10) Patent No.: US 10,568,109 B2
(45) Date of Patent: Feb. 18, 2020

(54) METHOD AND APPARATUS FOR TRANSMITTING SIGNAL BASED ON PRIORITIES OF CELLS IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 77 days.

(21) Appl. No.: 15/576,255

(22) PCT Filed: May 20, 2016

(86) PCT No.: PCT/KR2016/005398
§ 371 (c)(1),
(2) Date: Nov. 21, 2017

(87) PCT Pub. No.: WO2016/190626
PCT Pub. Date: Dec. 1, 2016

(65) Prior Publication Data
US 2018/0146485 A1    May 24, 2018

Related U.S. Application Data

(60) Provisional application No. 62/165,221, filed on May 22, 2015.

(51) Int. Cl.
*H04W 72/10* (2009.01)
*H04L 5/00* (2006.01)
*H04W 72/04* (2009.01)

(52) U.S. Cl.
CPC .......... *H04W 72/10* (2013.01); *H04L 5/0048* (2013.01); *H04W 72/0413* (2013.01)

(58) Field of Classification Search
CPC ............. H04W 72/10; H04W 72/0413; H04W 72/1263; H04L 5/0005; H04L 5/001; H04L 5/0048; H04L 5/0055; H04L 5/14
See application file for complete search history.

(56) References Cited

U.S. PATENT DOCUMENTS

2012/0327821 A1* 12/2012 Lin ................... H04W 72/048
370/280
2013/0242814 A1* 9/2013 Wang ................... H04L 1/1861
370/280

(Continued)

FOREIGN PATENT DOCUMENTS

EP      2557878      2/2013

OTHER PUBLICATIONS

PCT International Application No. PCT/KR2016/005398, Written Opinion of the International Searching Authority dated Sep. 1, 2016, 17 pages.

(Continued)

*Primary Examiner* — Ricky Q Ngo
*Assistant Examiner* — Stephen N Steiner
(74) *Attorney, Agent, or Firm* — Lee Hong Degerman Kang Waimey

(57) ABSTRACT

The present invention relates to a wireless communication system. Particularly, the present invention relates to a method for controlling a UL transmission by a terminal in a wireless communication system, and an apparatus therefor, the method comprising the steps of: configuring a first cell of a first UL-DL configuration and a second cell of a second UL-DL configuration, wherein SF # n is a UL SF or an S SF and SF # n+1 is a UL SF in the first cell, and SF # n is a DL SF in the second cell; and controlling a UL transmission in SF # n+1 of the first cell, wherein, when the priority of the first cell is higher than the second cell in SF # n, the UL transmission in SF # n+1 of the first cell is normally (Continued)

performed, and when the priority of the first cell is lower than the second cell in the SF # n, at least a part of the UL transmission in the SF # n+1 of the first cell is limited.

12 Claims, 14 Drawing Sheets

(56) References Cited

U.S. PATENT DOCUMENTS

2015/0365790 A1* 12/2015 Edge ................. H04W 4/90
            455/404.2
2017/0195028 A1* 7/2017 Shimezawa ........... H04W 24/10

OTHER PUBLICATIONS

Ericsson, "Clarification on Different TDD configurations for OTDOA in CA", 3GPP TSG RAN WG1 Meeting #81, R1-152515, May 2015, 3 pages.
3rd Generation Partnership Project (3GPP), "Technical Specification Group Radio Access Network; Evolved Universal Terrestrial Radio Access (E-UTRA); Physical channels and modulation (Release 12)," 3GPP TS 36.211 V12.5.0, Mar. 2015, 136 pages.

* cited by examiner

PUCCH format 1a and 1b structure (normal CP case)

No collision between DL of PCell and UL of SCell

Collision between SF #n+2 of PCell and SF #n+1 of SCell

METHOD AND APPARATUS FOR TRANSMITTING SIGNAL BASED ON PRIORITIES OF CELLS IN WIRELESS COMMUNICATION SYSTEM

CROSS-REFERENCE TO RELATED APPLICATIONS

This application is the National Stage filing under 35 U.S.C. 371 of International Application No. PCT/KR2016/005398, filed on May 20, 2016, which claims the benefit of U.S. Provisional Application No. 62/165,221, filed on May 22, 2015, the contents of which are all hereby incorporated by reference herein in its entirety.

TECHNICAL FIELD

The present invention relates to a wireless communication system and, more specifically, to a method and apparatus for transmitting/receiving signals. The wireless communication system can support carrier aggregation.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DETAILED DESCRIPTION OF THE INVENTION

Technical Problems

An object of the present invention devised to solve the problem lies in a method for efficiently transmitting/receiving signals in a wireless communication system and an apparatus for the same. Another object of the present invention is to provide a method for efficiently controlling a transmission of uplink signal and an apparatus for the same.

The technical problems solved by the present invention are not limited to the above technical problems and those skilled in the art may understand other technical problems from the following description.

Technical Solutions

According to an aspect of the present invention, provided herein is a method of controlling uplink (UL) transmission by a user equipment (UE) in a wireless communication system, including configuring a first cell of a first UL-downlink (DL) configuration and a second cell of a second UL-DL configuration, wherein subframe (SF) # n in the first cell is a UL SF or a special (S) SF, SF # n+1 in the first cell is a UL SF, and SF # n in the second cell is a DL SF; and controlling UL transmission in SF # n+1 of the first cell, wherein, when a priority of the first cell in SF # n is higher than a priority of the second cell in SF # n, UL transmission in SF # n+1 of the first cell is normally performed, when the priority of the first cell in SF # n is lower than the priority of the second cell in SF # n, at least a part of UL transmission in SF # n+1 of the first cell is limited, and an SF configuration in a radio frame according to a UL-DL configuration is as follows:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes the DL SF, U denotes the UL SF, S denotes the S SF, and the S SF includes a downlink pilot timeslot (DwPTS), a guard period (GP), an uplink pilot timeslot (UpPTS).

In another aspect of the present invention, provided herein is a user equipment (UE) used in a wireless communication system, including a radio frequency (RF) unit; and a processor, wherein the processor configures a first cell of a first uplink (UL)-downlink (DL) configuration and a second cell of a second UL-DL configuration, wherein subframe (SF) # n in the first cell is a UL SF or a special (S) SF, SF # n+1 in the first cell is a UL SF, and SF # n in the second cell is a DL SF, and controls UL transmission in SF # n+1 of the first cell, when a priority of the first cell in SF # n is higher than a priority of the second cell in SF # n, UL transmission in SF # n+1 of the first cell is normally performed, when the priority of the first cell in SF # n is lower than the priority of the second cell in SF # n, at least a part of UL transmission in SF # n+1 of the first cell is limited, and an SF configuration in a radio frame according to a UL-DL configuration is as follows:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes the DL SF, U denotes the UL SF, S denotes the S SF, and the S SF includes a downlink pilot timeslot (DwPTS), a guard period (GP), an uplink pilot timeslot (UpPTS).

The first cell may be a primary cell (PCell) and the second cell may be a secondary cell (SCell).

When a specific reference signal (RS) is not transmitted in SF # n of the second cell, the priority of the first cell in SF # n may be higher than the priority of the second cell in SF # n and, when the specific RS is transmitted in SF # n of the second cell, the priority of the first cell in the SF # n may be lower than the priority of the second cell in SF # n.

The specific RS may include a positioning reference signal (PRS).

When the priority of the first cell in SF # n is lower than the priority of the second cell in SF # n, transmission of a physical uplink control channel (PUCCH) and a physical uplink shared channel (PUSCH) in SF # n+1 of the first cell may be skipped.

When the priority of the first cell in SF # n is lower than the priority of the second cell in SF # n, transmission of a sounding reference signal (SRS) in SF # n+1 of the first cell may be normally performed.

Advantageous Effects

According to the present invention, it is possible to efficiently transmit/receive signals in a wireless communication system. Furthermore, it is possible to efficiently control transmission of an uplink signal.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

Figure 1:
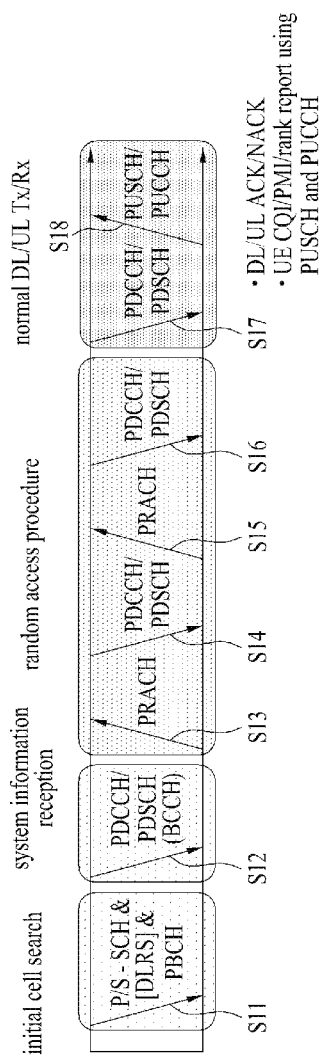
FIG. 1 illustrates physical channels used in a 3GPP LTE system as an exemplary wireless communication system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.\

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
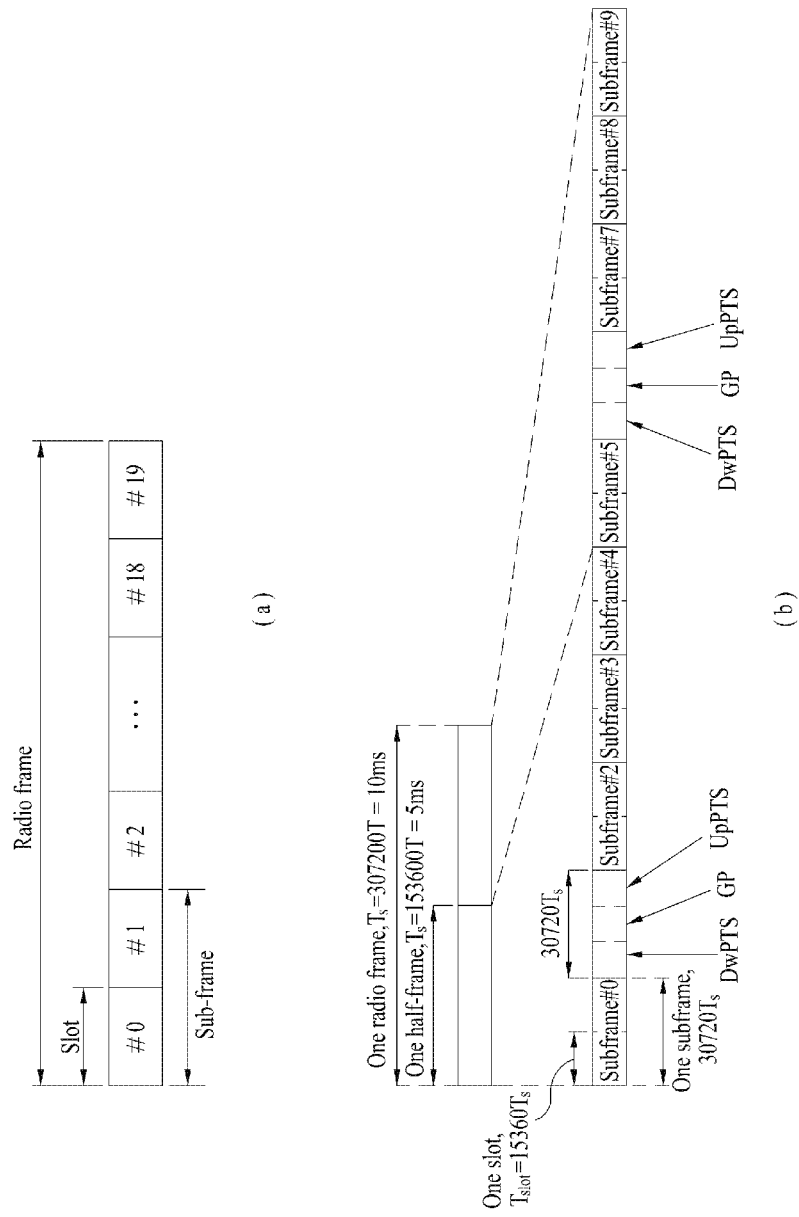
FIG. 2 illustrates a radio frame structure.

FIG. 2 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 1(0) special subframe. Normal subframes are used for an uplink or a downlink according to UL-DL configuration. A subframe includes 2 slots.

Table 1 shows subframe configurations in a radio frame according to UL-DL configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE. UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
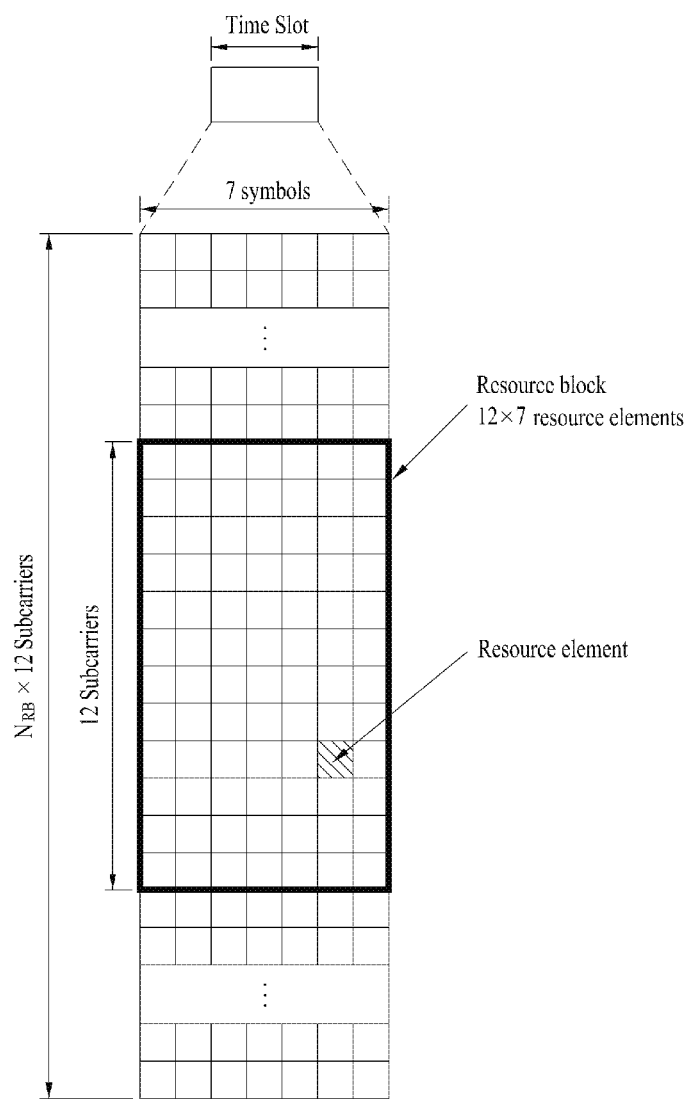
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include 7 OFDM symbols, and one resource block (RB) may include 12 subcarriers in the frequency domain. However, the present invention is not limited thereto. Each element on the resource grid is referred to as a resource element (RE). One RB includes 12×7(6) REs. The number $N^{DL}$ of RBs included in the downlink slot depends on a downlink transmit bandwidth. The structure of an uplink slot may be same as that of the downlink slot.

Figure 4:
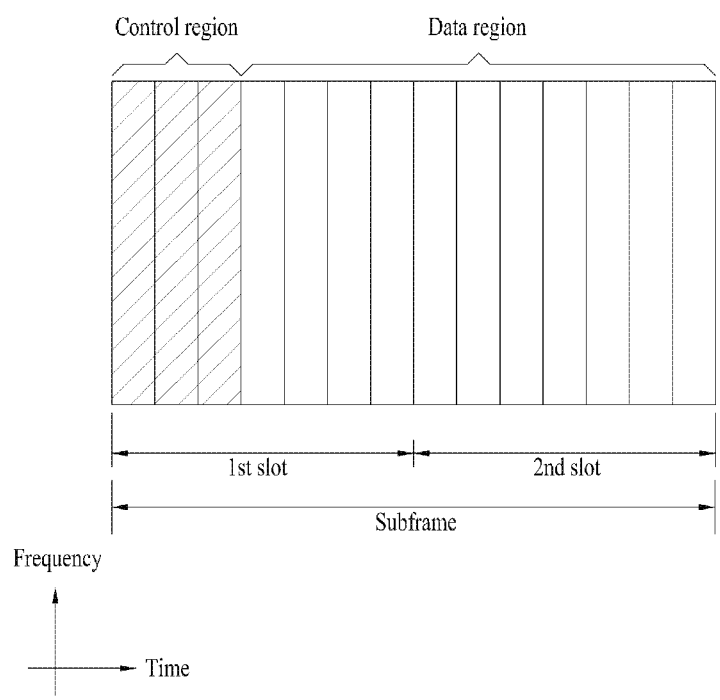
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through a PDCCH is referred to as DCI. Formats 0, 3, 3A and 4 for uplink and formats 1, 1A, 1B, 1C, 1D, 2, 2A, 2B and 2C for downlink are defined as DCI formats. Information field types, the number of information fields and the number of bits of each information field depend on DCI format. For example, the DCI formats selectively include information such as hopping flag, RB allocation, MCS (modulation coding scheme), RV (redundancy version), NDI (new data indicator), TPC (transmit power control), HARQ process number, PMI (precoding matrix indicator) confirmation as necessary. A DCI format can be used to transmit control information of two or more types. For example, DCI format 0/1A is used to carry DCI format 0 or DCI format 1, which are discriminated from each other by a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 5:
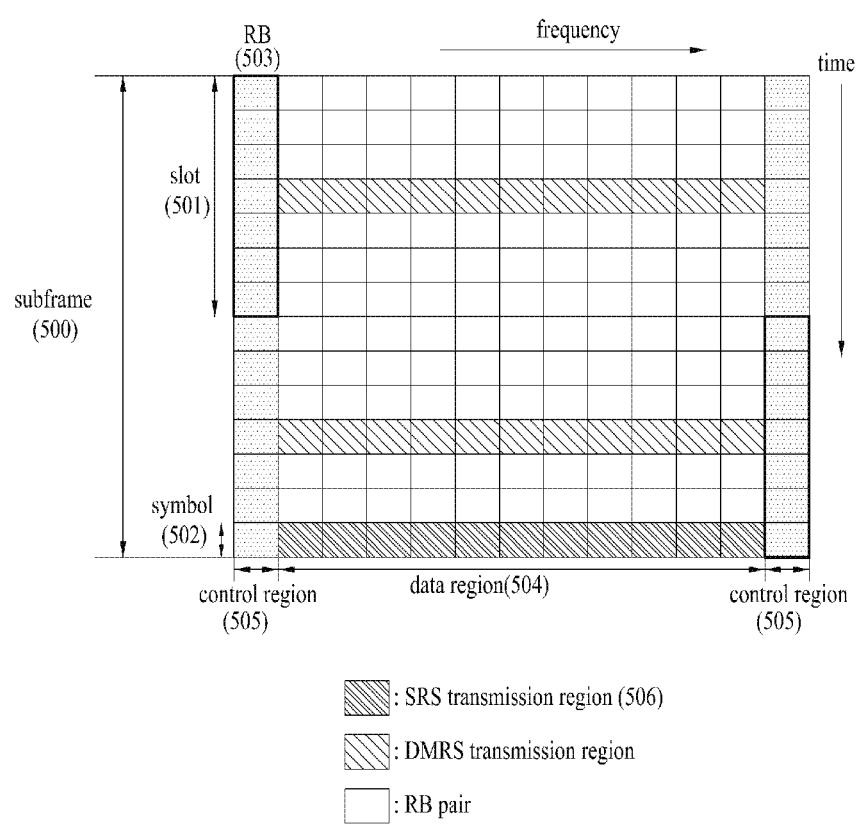
FIG. 5 illustrates an uplink subframe structure.

FIG. 5 illustrates an uplink subframe structure used in LTE.

Referring to FIG. 5, a subframe 500 includes two 0.5 ms slots 501. When a normal CP is used, each slot includes 7 symbols 502 each corresponding to an SC-FDMA symbol. A resource block 503 is a resource allocation unit corresponding to 12 subcarriers in the frequency domain and to a slot in the time domain. The uplink subframe is divided into a data region 504 and a control region 505. The data region refers to a communication resource used for a UE to transmit data such as audio data, packets, etc. and includes a PUSCH (physical uplink shared channel). The control region refers to a communication resource used for the UE to transmit uplink control information (UCI) and includes a PUCCH (physical uplink control channel).

The PUCCH can be used to transmit the following control information.

SR (scheduling request): This is information used to request a UL-SCH resource and is transmitted using On-Off Keying (OOK) scheme.

HARQ ACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ-ACK response includes positive ACK (simply, ACK), negative ACK (NACK), DTX or NACK/DTX. Here, HARQ-ACK is used interchangeably with HARQ ACK/NACK and ACK/NACK.

CSI (channel state information): This is feedback information about a downlink channel Feedback information regarding multiple input multiple output (MIMO) includes rank indicator (RI) and precoding matrix index (PMI). 20 bits are used for each subframe.

The quantity of control information that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 2 shows the mapping relationship between PUCCH formats and UCI in LTE(-A).

TABLE 2

| PUCCH format | UCI (Uplink Control Information) |
| --- | --- |
| Format 1 | SR (Scheduling Request) (non-modulated waveform |
| Format 1a | bit HARQ ACK/NACK (SR exist/non-exist) |
| Format 1b | bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

An SRS is transmitted through the last SC-FDMA symbol of the subframe (506). SRSs of multiple UEs, transmitted through the same SC-FDMA symbol, can be discriminated according to frequency position/sequence. The SRS is transmitted aperiodically or periodically.

Figure 6:
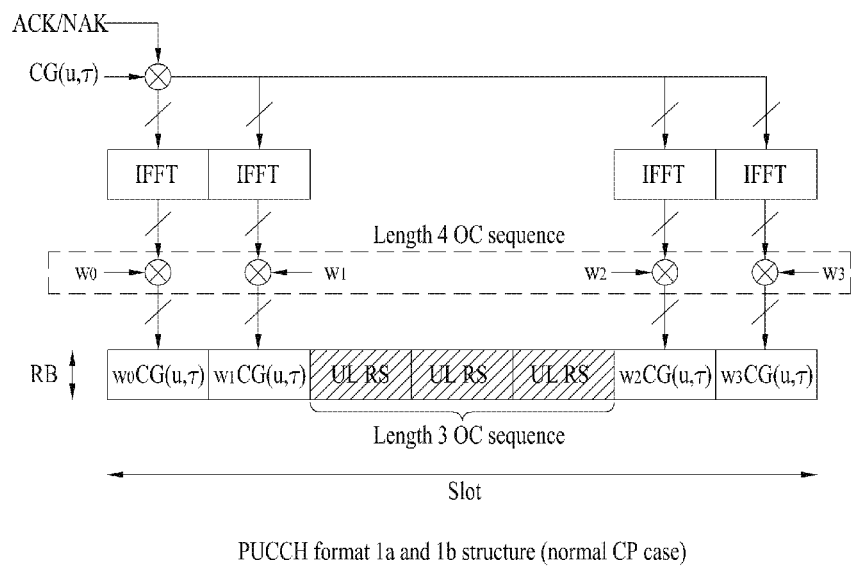
FIG. 6 illustrates a slot level structure of PUCCH format 1a/1b.

FIG. 6 illustrates a slot level structure of PUCCH formats 1a/1b. In the case of PUCCH formats 1a/1b, the same control information is repeated on a slot basis in a subframe. UEs transmit ACK/NACK signals through different resources configured of different cyclic shifts (CSs) (frequency domain codes) of a CG-CAZAC (computer-generated constant amplitude zero auto correlation) sequence and orthogonal covers or orthogonal cover codes (OCs or OCCs) (time domain spreading codes). The OC includes a Walsh/DFT orthogonal code, for example. When the number of CSs is 6 and the number of OCs is 3, 18 UEs can be multiplexed in the same PRB (physical resource block) on the basis of a single antenna.

Figure 7:
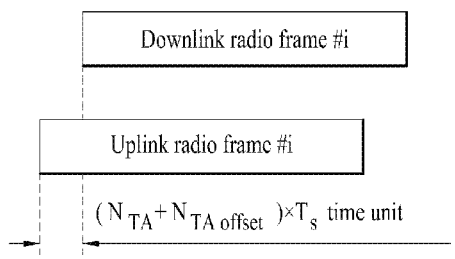
FIG. 7 illustrates a UL-DL frame timing.

FIG. 7 illustrates a UL-DL frame timing relationship.

Referring to FIG. 7, a UE starts to transmit a UL radio frame i faster than a corresponding DL radio frame by $(N_{TA}+N_{TAoffset})*T_s$ seconds. In an LTE system, $0 \leq N_{TA} \leq 20512$, $N_{TAoffset}=0$ for TDD, and $N_{TAoffset}=624$. $N_{Taoffset}$ is a value recognized between a BS and a UE. If $N_{TA}$ is indicated by a timing advance command in a random access procedure, the UE adjusts the transmission timing of a UL signal (e.g., PUCCH/PUSCH/SRS) by the above equation. The UL transmission timing is set to a multiple of $16T_s$. The timing advance command indicates variation in UL timing based on a current UL timing. A timing advance command $T_A$ in a random access response is 11 bits indicating a value of 0, 1, 2, ..., 1282 and a timing adjustment value $N_{TA}$ is given as $N_{TA}=T_A*16$. In the other cases, the timing advance command $T_A$ is 6 bits indicating a value of 0, 1, 2, ..., 63 and the timing adjustment value $N_{TA}$ is given as $N_{TA,new}=N_{TA,old}+(T_A-31)*16$. The timing advance command received in SF # n is applied starting from SF # n+6. In FDD, the transmission timing of UL SF # n is advanced based on the start timing of DL SF # n, as illustrated in FIG. 7. In TDD, on the other hand, the transmission timing of UL SF # n is advanced based on the end timing of DL SF # n+1 (not illustrated).

Figure 8:
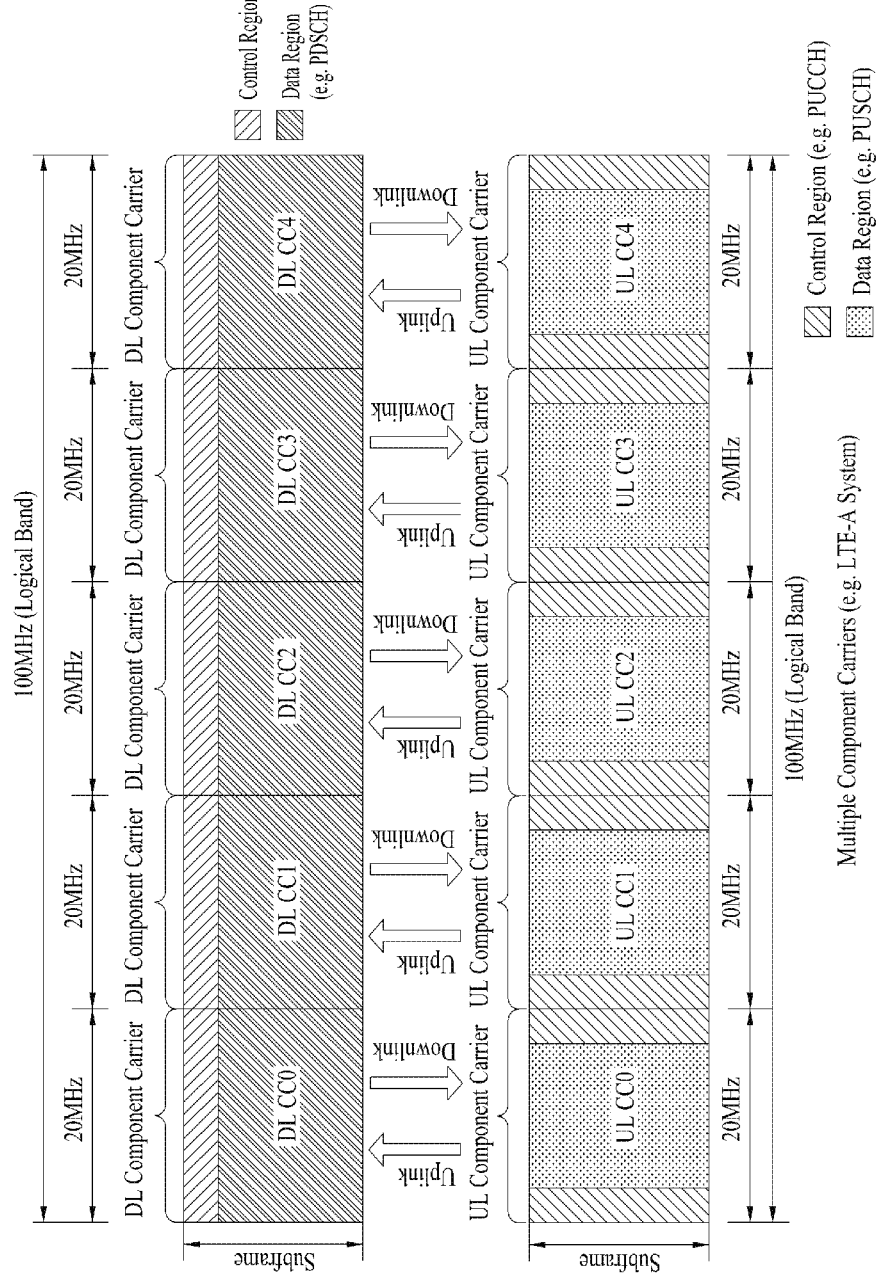
FIG. 8 illustrates a CA (carrier aggregation) communication system.

FIG. 8 illustrates a carrier aggregation (CA) communication system.

Referring to FIG. 8, to support a wider uplink/downlink bandwidth, multiple UL/DL component carriers (CCs) are aggregated. CCs may be contiguous or non-contiguous in the frequency domain. The bandwidth of each component carrier can be independently determined. Asymmetrical carrier aggregation in which the number of UL CCs is different from the number of DL CCs is possible. Control information may be transmitted and received through a specific CC only. The specific CC may be referred to as a primary CC and other CCs may be referred to as secondary CCs. For example, cross-carrier scheduling (or cross-CC scheduling) is applied, a PDCCH for downlink allocation can be transmitted through DL CC #0 and a PDSCH corresponding to the PDCCH can be transmitted through DL CC #2. The term "component carrier" can be replaced by equivalent terms (e.g. carrier, cell, etc.).

For cross-CC scheduling, a carrier indicator field (CIF) is used. Setting of presence or absence of a CIF in a PDCCH can be enabled through higher layer signaling (e.g. RRC signaling) semi-statically UE-specifically (or UE-group-specifically). PDCCH transmission can be arranged as follows.

CIF disabled: a PDCCH on a DL CC is used to allocate a PDSCH resource on the same DL CC or a PUSCH resource on a linked UL CC.
No CIF
CIF enabled: a PDCCH on a DL CC can be used to allocate a PDSCH or PUSCH resource on a specific DL/UL CC from among a plurality of aggregated DL/UL CCs using the CIF.
LTE DCI format extended to have the CIF
CIF is a fixed x-bit field (e.g. x=3) (when the CIF is set).
CIF position is fixed irrespective of DCI format size (when the CIF is set).

When the CIF is present, a BS can allocate a monitoring DL CC (set) in order to reduce BD complexity in a UE. For PDSCH/PUSCH scheduling, the UE can detect/decode a PDCCH only in the corresponding DL CC. The BS can transmit the PDCCH through the monitoring DL CC (set) only. The monitoring DL CC set can be set UE-group-specifically or cell-specifically.

Figure 9:
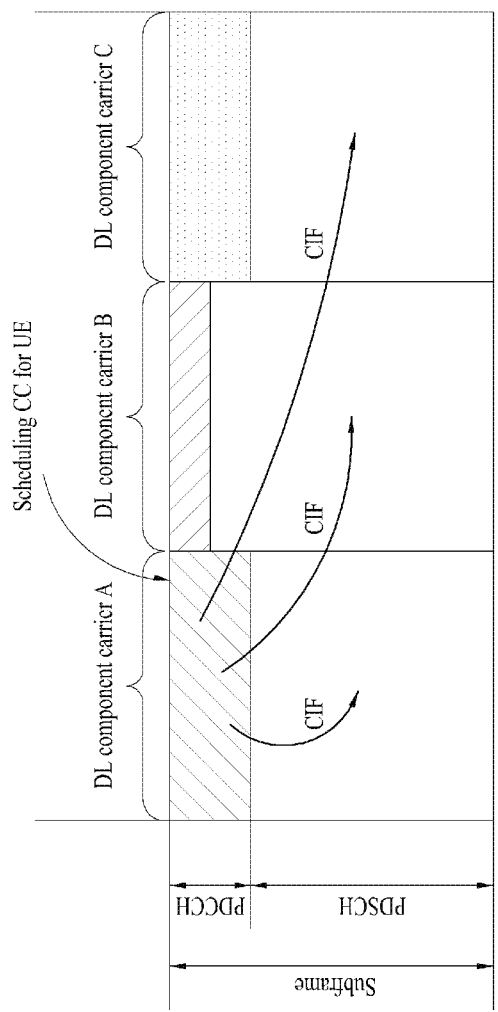
FIG. 9 illustrates cross-carrier scheduling.

FIG. 9 illustrates a case in which 3 DL CCs are aggregated and DL CC A is set as a monitoring DL CC. When the CIF is disabled, each DL CC can transmit a PDCCH that schedules a PDSCH of each DL CC without the CIF according to LTE PDCCH rules. When the CIF is enabled through higher layer signaling, only DL CC A can transmit PDCCHs that schedule PDSCHs of other DL CCs as well as the PDSCH thereof using the CIF. A PDCCH is not transmitted through DL CC B and DL CC C which are not set as a monitoring DL CC. Here, "monitoring DL CC (MCC)" can be replaced by equivalent terms such as a monitoring carrier, monitoring cell, scheduling carrier, scheduling cell, serving carrier, serving cell, etc. A PCC can be referred to as an MCC for scheduling. A DL CC through which a PDSCH corresponding to a PDCCH is transmitted and a UL CC through which a PUSCH corresponding to the PUCCH is transmitted can be referred to as scheduled carriers, scheduled cells, etc.

In a situation in which a plurality of cells is aggregated (i.e., CA) with respect to one UE, simultaneous transmission and reception in the plural cells may not be permitted or may be impossible, due to a hardware configuration of the UE or indication from a BS. Accordingly, if subframes (SFs) having different transmission directions in the multiple cells collide at the same timing (hereinafter, referred to as a collided SF), an SF of a specific cell or SFs of the multiple cells in a way of prioritizing a specific transmission direction may be configured. As an example, simultaneous transmission and reception may be limited in a situation in which a plurality of cells having different UL-DL configurations is aggregated. In this case, in 3GPP standard, an SF (i.e., a transmission direction) in a primary cell (PCell) may be basically prioritized. Then, 1) if D of the PCell collides with U or S of a secondary cell (SCell), transmission of all UL signals in the SCell may be limited/skipped, 2) if U of the PCell collides with D of the SCell, reception of all DL signals in the SCell may be limited/skipped, and 3) if S of the PCell collides with D of the SCell, only reception of legacy control channels such as PCFICH/PHICH/PDCCH signals may be permitted on the SCell and reception of PDSCH/EPDCCH/PMCH/PRS signals may be limited/skipped (hereinafter, referred to as half-duplex (HD)-TDD CA).

Figure 10:
FIGS. 10 and 11 illustrate TDD based CA of a half-duplex (HD) scheme.
Figure 10:
Figure 11:

FIGS. 10 and 11 illustrate HD-TDD CA structures. In FIGS. 10 and 11, gray shading illustrates a CC (link direction) in which usage is limited in a collided SF. Referring to FIG. 10, in a situation in which a PCell is set to a UL SF and an SCell is set to a DL SF, only the UL SF of the PCell may be used and reception of all DL signals in the DL SF of the SCell may be limited/skipped. Referring to FIG. 11, in a situation in which a PCell is set to a DL SF and an SCell is set to a UL SF, the DL SF of the PCell may be used and transmission of all UL signals in the UL SF of the SCell may be limited/skipped.

Meanwhile, a BS periodically transmits a positioning reference signal (PRS) to a UE in order to calculate location information of the UE. Since the PRS is transmitted at a longer period than other DL reference signals (RSs) transmitted by the BS, the UE needs to measure, within a short time, the PRS which is transmitted infrequently and report a result of measurement. If the UE misses even a single SF in which the PRS is transmitted, PRS measurement quality may be remarkably deteriorated. Accordingly, if the UE performs an HD operation, it may be effective with respect to an SF including specific DL RS (e.g., PRS) transmission that an SCell is prioritized relative to a PCell even though the SF is included in the SCell.

Hereinafter, in a specific overlap SF (hereinafter, referred to as a special overlap SF) in which a specific D of the SCell (hereinafter, referred to as a special SCell-D) collides with S or U of the PCell (hereinafter, referred to as a collided PCell-S/U), an HD based UE transmission and reception operation method for prioritizing the special SCell-D will be proposed. Herein, the special SCell-D refers to a DL SF in which the SCell has a higher priority than the PCell. The special SCell-D may be periodically configured in the SCell. For convenience, a DL SF except for the special SCell-D in the SCell is referred to as a non-special SCell-D. The special SCell-D may be limited to an SF set to a transmission (transmittable) timing of a specific DL RS (e.g., PRS) in the SCell. However, the present invention is not limited thereto.

Figure 12:
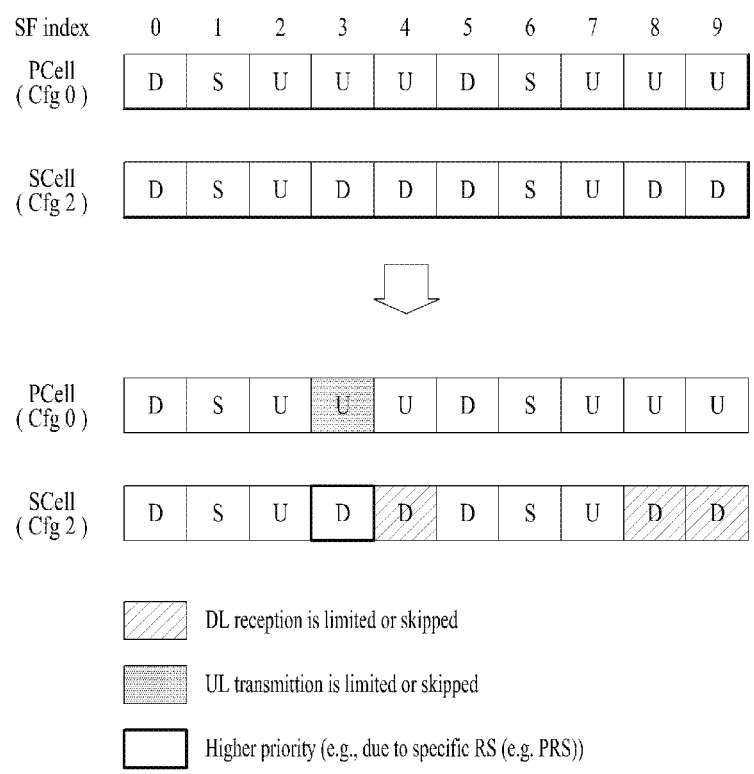
FIGS. 12 to 15 are diagrams illustrating signal transmission methods according to an embodiment of the present invention.

FIG. 12 illustrates an exemplary UL transmission process according to the present invention. It is assumed that multiple cells including a PCell and an SCell are configured/aggregated with respect to one UE. It is also assumed that the PCell is configured as UL-DL configuration #0 and the SCell is configured as UL-DL configuration #2, through signaling (e.g., system information) from a BS. In this case, assuming that a special SCell-D is SF #3, SFs in the SCell may be classified as follows.

DL SFs of the SCell: SFs #0, #3, #4, #5, #8, and #9
Collided SFs: SFs #3, #4, #8, and #9
Non-collided SFs: SFs #0, #1, #2, #5, #6, and #7
Special SCell-D: SF #3
Non-special SCell-Ds: SFs #0, #4, #5, #8, and #9

Accordingly, the UE performs a transmission/reception operation according to a transmission direction of each cell in non-collided SFs. If U of the PCell collides with a non-special SCell-D of the SCell, reception of all DL signals in the SCell may be limited/skipped. Although not illustrated, if S of the PCell collides with the non-special SCell-D of the SCell, only reception of legacy control channels such as PCFICH/PHICH/PDCCH signals may be permitted in the SCell and reception of PDSCH/EPDCCH/PMCH/PRS signals may be limited/skipped in the SCell. Meanwhile, if S or U of the PCell collides with a special SCell-D of the SCell, transmission of all UL signals in a collided PCell-S/U may be limited/skipped in order to receive the special SCell-D in a special overlap SF.

Figure 13:
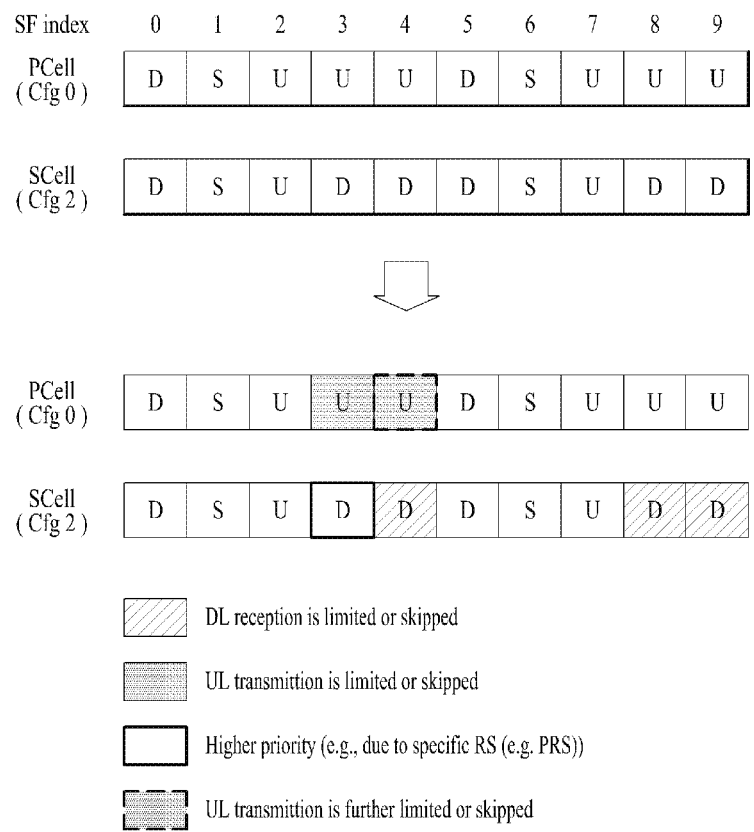

FIG. 13 illustrates another exemplary UL transmission process according to the present invention. A DL reception timing is delayed by a propagation delay and a UL transmission timing is advanced by a timing advance command Therefore, the reception end timing of a special SCell-D may be located after the transmission start timing of a next PCell-U. Then, even with respect to U of the PCell in an SF immediately next to a special overlap SF (hereinafter, this adjacent SF will be referred to as a next SF and this U of the PCell will be referred to as a next PCell-U), transmission of all or specific UL signals in the next PCell-U may be limited/skipped for reception of the special SCell-D. The UL signals, transmission of which is limited/skipped in the next PCell-U, may be limited to PUCCH/PUSCH/PRACH signals. Exceptionally, transmission of an SRS in the next PCell-U may be permitted. In this case, reception of all or specific DL signals transmitted through D of the SCell in the next SF may be additionally performed/permitted and the corresponding specific DL signals may be limited to PCFICH/PHICH/PDCCH signals.

Referring to FIG. 13, SFs in the PCell/SCell may be classified as follows.

DL SFs of the SCell: SFs #0, #3, #4, #5, #8, and #9
Collided SFs: SFs #3, #4, #8, and #9
Non-collided SFs: SFs #0, #1, #2, #5, #6, and #7
Special SCell-D: SF #3
Next SF (=next PCell-U): SF #4
Non-special SCell-Ds: SFs #0, #4, #5, #8, #9

The operation of the UE in FIG. 13 is basically identical to that in FIG. 12. However, in FIG. 13, when U of the PCell collides with the special SCell-D of the SCell, transmission of all or specific UL signals in the next PCell-U may be limited/skipped for reception of the special SCell-D.

Figure 14:
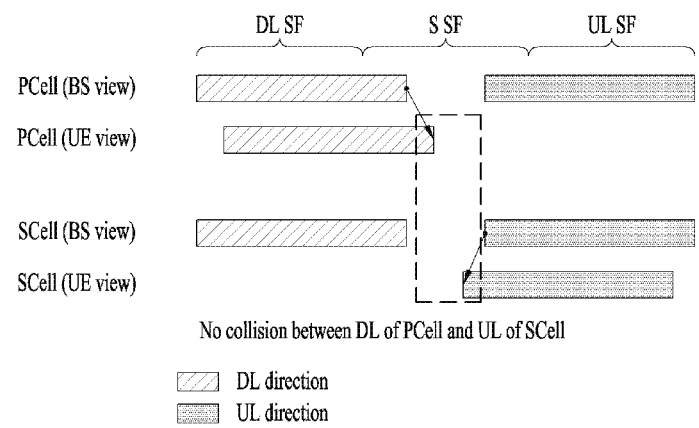
Figure 15:
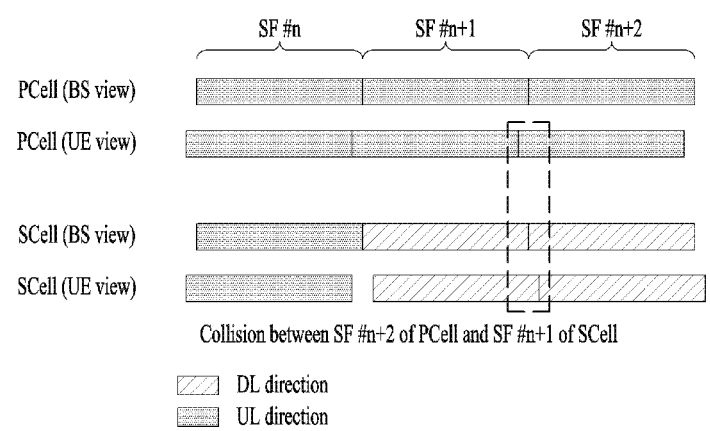

FIGS. 14 and 15 are diagrams illustrating signal collision in a next SF. FIG. 15 illustrates signal collision/non-collision in the next SF in a legacy process. FIG. 14 corresponds to a part of FIG. 11 and FIG. 15 corresponds to a part (SFs #2 to 4) of FIG. 13.

Referring to FIG. 14, in a legacy process, a transmission direction of a PCell is always prioritized relative to an SCell and the end of DL SF(s) is always configured as an S SF. That is, the end of the DL SF in the PCell has a structure of {DL SF, S SF, UL SF}. Since the S SF includes a guard period (GP) for DL-UL switching, even when a DL reception timing of the PCell is delayed by a DL transmission propagation delay etc. and a UL transmission timing of the SCell is advanced by a UL transmission timing advance, the DL reception timing and the UL transmission timing do not collide by the GP. Therefore, according to the legacy process, transmission of a UL signal of the SCell in an SF (i.e., S SF) next to the DL SF need not be limited/skipped. However, referring to FIG. 15, in the present invention, a transmission priority of the SCell is higher than that of the PCell only in specific DL SFs of the SCell and a transmission priority of the PCell is higher than that of the SCell in the other SFs. Assuming that SF # n+1 of the SCell is a specific DL SF, the UE may perform DL reception in the SCell in SF # n+1 and perform UL transmission in the PCell in SF # n+2. In this case, if a DL reception timing of the SCell is delayed by a DL transmission propagation delay etc. and a UL transmission timing of the PCell is advanced by a UL transmission timing advance, the DL reception timing of the SCell and the UL transmission timing of the PCell may collide. Accordingly, in order to protect DL reception (e.g., PRS reception) of the SCell, transmission of all or specific UL signals of the PCell in SF # n+2 may be limited/skipped. UL signals, transmission of which is limited/skipped, may be limited to PUCCH/PUSCH/PRACH signals and SRS transmission may be exceptionally permitted.

The present invention may be generalized as follows. A cell in which transmission of UL signals is limited/skipped in a special overlap SF and a next SF may not be limited to the PCell. Specifically, an operation of limiting/skipping transmission of UL signals in a collided PCell-S/U and a next PCell-U may be identically applied to arbitrary or all cells in which S or U is configured in a special overlap SF. In this case, the SCell may be replaced with a cell in which transmission of a specific DL RS (e.g., PRS) is configured in the special overlap SF and the PCell may be replaced with a cell in which S or U is configured in the special overlap SF. More generally, during a duration in which the specific DL RS (e.g., PRS) is received from a specific cell, transmission of all UL signals through the other cells may be limited/skipped.

Figure 16:
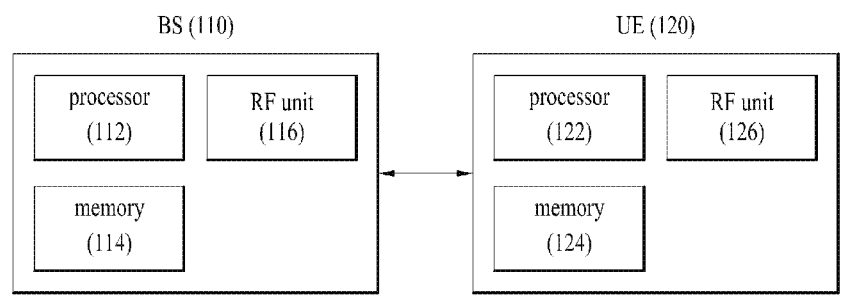
FIG. 16 illustrates a BS and a UE applicable to the present invention.

FIG. 16 illustrates a BS, a relay and a UE applicable to the present invention.

Referring to FIG. 16, a wireless communication system includes a BS 110 and a UE 120. When the wireless communication system includes a relay, the BS or UE can be replaced by the relay.

The BS 110 includes a processor 112, a memory 114, and an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other devices of a wireless mobile communication system. Specifically, the present invention is applicable to a method for transmitting uplink control information and an apparatus for the same.

The invention claimed is:

1. A method of transmitting an uplink (UL) signal by a user equipment (UE) in a wireless communication system, the method comprising:
configuring a first UL-downlink (DL) configuration for a first cell a second UL-DL configuration for a second cell,
wherein, based on respective ones of the first and the second UL-DL configurations, a subframe (SF) # n and a SF # n+1 of the first cell are used for UL transmission and a SF # n of the second cell is used for DL reception, and
based on a first priority of the SF # n of the first cell and a second priority of the SF # n of the second cell, transmitting an uplink signal in the SF # n+1 of the first cell,
wherein, when the first priority is higher than the second priority, transmission of the uplink signal in the SF # n+1 of the first cell is performed,
wherein, when the first priority is lower than the second priority, the transmission of the uplink signal in the SF # n+1 of the first cell is skipped based on a type of the uplink signal, and
wherein an SF configuration in a radio frame according to a UL-DL configuration is as follows:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink SF, U denotes an uplink SF, S denotes a special SF, and the S SF includes a downlink pilot timeslot (DwPTS), a guard period (GP), and an uplink pilot timeslot (UpPTS).

2. The method according to claim 1, wherein the first cell is a primary cell (PCell) and the second cell is a secondary cell (SCell).

3. The method according to claim 1,
wherein, when a specific reference signal (RS) is not received in the SF # n of the second cell, the first priority is higher than the second priority, and
wherein, when the specific RS is received in the SF # n of the second cell, the first priority is lower than the second priority.

4. The method according to claim 3, wherein the specific RS includes a positioning reference signal (PRS).

5. The method according to claim 1, wherein the type of the uplink signal comprises one of a physical uplink control channel (PUCCH) or a physical uplink shared channel (PUSCH).

6. The method according to claim 5, wherein the type of the uplink signal does not comprise a sounding reference signal (SRS) such that, when the first priority is lower than the second priority, transmission of the SRS in the SF # n+1 of the first cell is not skipped.

7. A user equipment (UE) transmitting an uplink (UL) signal in a wireless communication system, the UE comprising:
a radio frequency (RF) unit; and
at least one processor,
wherein the at least one processor configured to:
configure a first UL-downlink (DL) configuration for a first cell and a second UL-DL configuration for a second cell,
wherein, based on respective ones of the first and the second UL-DL configurations, a subframe (SF) # n and a SF # n+1 of the first cell are used for UL transmission and a SF # n of the second cell is used for DL reception, and
based on a first priority of the SF # n of the first cell and a second priority of the SF # n of the second cell, control the RF unit to transmit an uplink signal in the SF # n+1 of the first cell,
wherein, when the first priority is higher than the second priority, transmission of the uplink signal in the SF # n+1 of the first cell is performed, wherein, when the first priority is lower than the second priority, the transmission of the uplink signal in the SF # n+1 of the first cell is skipped based on a type of the uplink signal, and wherein an SF configuration in a radio frame according to a UL-DL configuration is as follows:

| UL-DL configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink SF, U denotes an uplink SF, S denotes a special SF, and the S SF includes a downlink pilot timeslot (DwPTS), a guard period (GP), and an uplink pilot timeslot (UpPTS).

8. The UE according to claim 7, wherein the first cell is a primary cell (PCell) and the second cell is a secondary cell (SCell).

9. The UE according to claim 7,
wherein, when a specific reference signal (RS) is not received in the SF # n of the second cell, the first priority is higher than the second priority, and
wherein, when the specific RS is received in the SF # n of the second cell, the first priority is lower than the second priority.

10. The UE according to claim 9, wherein the specific RS includes a positioning reference signal (PRS).

11. The UE according to claim 7, wherein the type of the uplink signal comprises one of a physical uplink control channel (PUCCH) or a physical uplink shared channel (PUSCH).

12. The UE according to claim 11, wherein the type of the uplink signal does not comprise a sounding reference signal (SRS) such that, when the first priority is lower than the second priority, transmission of the SF # n+1 of the first cell is not skipped.

* * * * *